(12) United States Patent
Sakita et al.

(10) Patent No.: US 10,874,964 B2
(45) Date of Patent: Dec. 29, 2020

(54) FILTER MEDIUM FOR LIQUID FILTER AND LIQUID FILTER

(71) Applicant: TEIJIN FRONTIER CO., LTD., Osaka (JP)

(72) Inventors: Kazuyoshi Sakita, Osaka (JP); Mie Kamiyama, Osaka (JP)

(73) Assignee: TEIJIN FRONTIER CO.. LTD., Osaka (JP)

( * ) Notice: Subject to any disclaimer, the term of this patent is extended or adjusted under 35 U.S.C. 154(b) by 143 days.

(21) Appl. No.: 16/083,921

(22) PCT Filed: Feb. 20, 2017

(86) PCT No.: PCT/JP2017/006055
§ 371 (c)(1),
(2) Date: Sep. 11, 2018

(87) PCT Pub. No.: WO2017/159216
PCT Pub. Date: Sep. 21, 2017

(65) Prior Publication Data
US 2019/0070540 A1    Mar. 7, 2019

(30) Foreign Application Priority Data

Mar. 15, 2016  (JP) ................................ 2016-051021

(51) Int. Cl.
| B01D 39/16 | (2006.01) |
| D21H 13/24 | (2006.01) |
| D21H 13/26 | (2006.01) |
| D21H 27/08 | (2006.01) |
| D04H 1/541 | (2012.01) |

(Continued)

(52) U.S. Cl.
CPC ........... B01D 39/163 (2013.01); B01D 39/16 (2013.01); D01D 5/26 (2013.01); D01F 8/12 (2013.01);

(Continued)

(58) Field of Classification Search
CPC .... B01D 2239/1225; B01D 2239/1233; B01D 39/16; B01D 2239/10; B01D 2239/0233;

(Continued)

(56) References Cited

U.S. PATENT DOCUMENTS

| 5,254,399 A | 10/1993 | Oku et al. | |
| 10,252,201 B2 * | 4/2019 | Kamiyama | ............ D21H 27/08 |

(Continued)

FOREIGN PATENT DOCUMENTS

| EP | 2138634 A1 | 12/2009 |
| JP | 63-219623 A | 9/1988 |

(Continued)

OTHER PUBLICATIONS

Communication dated Jun. 25, 2019, from the Japanese Patent Office in counterpart application No. 2018-505373.

(Continued)

*Primary Examiner* — Ana M Fortuna
(74) *Attorney, Agent, or Firm* — Sughrue Mion, PLLC (57) ABSTRACT

The invention addresses the problem of providing a filter medium for a liquid filter, which has a low weight per unit and yet has high strength, high collectability, and a long life, and also a liquid filter. As a means for resolution, using a main fiber having a fiber diameter of 4.0 μm or less and an aspect ratio of 100 to 2,500 and a binder fiber having a fiber diameter of 3.0 μm or less and an aspect ratio of 100 to 2,500, a filter medium for a liquid filter in which the weight proportion of the binder fiber relative to the weight of the filter medium is 10 to 50 wt %, and the weight per unit is within a range of 5 to 80 g/m², and also a liquid filter are obtained.

13 Claims, 1 Drawing Sheet

(51) Int. Cl.
   *D21H 13/14*   (2006.01)
   *D21H 15/10*   (2006.01)
   *D01D 5/26*    (2006.01)
   *D01F 8/12*    (2006.01)
   *D01F 8/14*    (2006.01)
   *D01F 8/16*    (2006.01)

(52) U.S. Cl.
   CPC ............... *D01F 8/14* (2013.01); *D01F 8/16* (2013.01); *D04H 1/541* (2013.01); *D21H 13/14* (2013.01); *D21H 13/24* (2013.01); *D21H 13/26* (2013.01); *D21H 15/10* (2013.01); *D21H 27/08* (2013.01); *B01D 2239/0233* (2013.01); *B01D 2239/0618* (2013.01); *B01D 2239/086* (2013.01); *B01D 2239/1208* (2013.01); *B01D 2239/1216* (2013.01); *B01D 2239/1225* (2013.01); *B01D 2239/1233* (2013.01); *B01D 2239/1291* (2013.01); *D10B 2331/02* (2013.01); *D10B 2331/04* (2013.01); *D10B 2331/301* (2013.01); *D10B 2401/063* (2013.01); *D10B 2505/04* (2013.01)

(58) Field of Classification Search
   CPC ...... B01D 2239/0618; B01D 2239/086; D21H 27/08; Y10T 442/186; Y10T 442/60
   See application file for complete search history.

(56) References Cited

U.S. PATENT DOCUMENTS

| | | | | |
|---|---|---|---|---|
| 10,550,803 | B2* | 2/2020 | Hamada | B01D 39/163 |
| 2008/0302072 | A1* | 12/2008 | Hassmann | B01D 39/2017 |
| | | | | 55/486 |
| 2009/0039013 | A1* | 2/2009 | Sakadume | B01D 39/1615 |
| | | | | 210/500.21 |
| 2010/0133173 | A1 | 6/2010 | Inagaki | |
| 2013/0199141 | A1* | 8/2013 | Hamada | B01D 39/163 |
| | | | | 55/486 |
| 2014/0360145 | A1* | 12/2014 | Hamada | B01D 39/163 |
| | | | | 55/482 |
| 2016/0367922 | A1* | 12/2016 | Kamiyama | D21H 27/08 |
| 2018/0280844 | A1* | 10/2018 | Shim | D21H 13/24 |

FOREIGN PATENT DOCUMENTS

| | | | |
|---|---|---|---|
| JP | 2005-218909 | A | 8/2005 |
| JP | 2008-163484 | A | 7/2008 |
| JP | 2009-197374 | A | 9/2009 |
| JP | 2010-70860 | A | 4/2010 |
| JP | 2012-092461 | A | 5/2012 |
| JP | 2012-237084 | A | 12/2012 |
| JP | 2013-122101 | A | 6/2013 |
| JP | 2013-147771 | A | 8/2013 |
| JP | 2014-074246 | A | 4/2014 |
| JP | 2014-159033 | A | 9/2014 |
| WO | 2008/130019 | A1 | 10/2008 |

OTHER PUBLICATIONS

International Search Report of PCT/JP2017/006055 dated Apr. 4, 2017.
Communication dated Dec. 20, 2018 from the European Patent Office in application No. 17766223.6.
Communication dated Dec. 18, 2019 from Japanese Patent Office in counterpart JP Application No. 2018-505373.

* cited by examiner

FILTER MEDIUM FOR LIQUID FILTER AND LIQUID FILTER

CROSS REFERENCE TO RELATED APPLICATIONS

This application is a National Stage of International Application No. PCT/JP2017/006055 filed Feb. 20, 2017, claiming priority based on Japanese Patent Application No. 2016-051021 filed Mar. 15, 2016.

TECHNICAL FIELD

The present invention relates to a filter medium for a liquid filter, which has a low weight per unit and yet has high strength, high collectability, and a long life, and also to a liquid filter.

BACKGROUND ART

In the manufacturing process of industrial products, such as foods, beverages, pharmaceuticals, and electronics, a filtration step is an important step. The filtration step is important not only in terms of improving the liquid quality after filtration and productivity but also in terms of product protection and environmental preservation.

Conventional liquid filters for use in the filtration step of a manufacturing process include microfiltration filters, ultrafiltration filters, reverse osmosis membranes, and the like. Particles to be filtered through a microfiltration filter have a size of 0.5 to 10 μm.

As a filter medium for such a microfiltration filter, conventionally, a spunbond nonwoven fabric or a meltblown nonwoven fabric has been used. However, spunbond nonwoven fabrics and meltblown nonwoven fabrics are problematic in that because the fiber diameter is large, the nonwoven fabric has a large pore size, or because the fiber diameter is non-uniform, the nonwoven fabric has a non-uniform pore size.

As a measure to solve these problems, it has been proposed that a nonwoven fabric having a large weight per unit is produced and then compressed in the thickness direction through a heat treatment step such as calendering, thereby making the pore size small and making the pore size uniform (see, e.g., PTL 1).

However, such a method is problematic in that the weight per unit increases, and also that because the reduction of the large pore size is attempted by compression, although the collection performance improves, the pressure drop increases. As a result, there have been problems in that the filter life decreases, or, because filtration takes place at high pressure, a gel-like product is deformed upon passage. Further, dust particles are pressed into the nonwoven fabric, causing a blockage, for example.

As another measure, it has also been proposed to reduce the size of the meltblowing nozzle to make the pore size small (see, e.g., PTL 2), but the results are not yet satisfactory.

In addition, as a method for producing a filter medium made of microfibers, an electrostatic spinning method has been known (see, e.g., PTL 3). However, in the filter medium obtained by such a method, the strength of the filter medium is low, and the workability in cartridge production is extremely low.

CITATION LIST

Patent Literature

PTL 1: JP-A-2014-159033
PTL 2: JP-2013-147771
PTL 3: JP-A-2005-218909

SUMMARY OF INVENTION

Technical Problem

The invention has been accomplished against the above background. An object thereof is to provide a filter medium for a liquid filter, which has a low weight per unit and yet has high strength, high collectability, and a long life, and also a liquid filter.

Solution to Problem

The present inventors have conducted extensive research to solve the above problems. As a result, they have found that when not only a main fiber but also a binder fiber is a fiber having a small fiber diameter, a filter medium for a liquid filter, which has a low weight per unit and yet has high strength, high collectability, and a long life, can be obtained. As a result of further extensive research, they have accomplished the invention.

Thus, the invention provides "a filter medium for a liquid filter, the filter medium for a liquid filter being characterized by: including a main fiber having a fiber diameter of 4.0 μm or less and an aspect ratio of 100 to 2,500 and a binder fiber having a fiber diameter of 3.0 μm or less and an aspect ratio of 100 to 2,500, the weight proportion of the binder fiber relative to the weight of the filter medium being 10 to 50 wt %; and having a weight per unit within a range of 5 to 80 g/m$^2$."

At this time, it is preferable that the main fiber includes a polyester fiber, a polyphenylene sulfide fiber, a polyolefin fiber, or a nylon fiber. In addition, it is preferable that the binder fiber includes a composite fiber or an undrawn fiber. In addition, it is preferable that the filter medium for a liquid filter includes a wet-laid nonwoven fabric.

In the filter medium for a liquid filter of the invention, it is preferable to have a thickness within a range of 10 to 100 μm. In addition, it is preferable to have a porosity within a range of 50 to 90%. In addition, it is preferable to have a tensile strength of 8 N/15 mm or more in the MD direction and 3 N/15 mm or more in the CD direction. In addition, it is preferable to have a tensile elongation of 10% or more in the MD direction and 10% or more in the CD direction. In addition, it is preferable to have an average pore size of 2.0 μm or less.

In addition, the invention provides a liquid filter including the filter medium for a liquid filter described above and being cartridge type.

Advantageous Effects of Invention

According to the invention, a filter medium for a liquid filter, which has a low weight per unit and yet has high strength, high collectability, and a long life, and also a liquid filter are obtained.

DESCRIPTION OF EMBODIMENTS

Hereinafter, embodiments of the invention will be described in detail. First, the filter medium for a liquid filter of the invention includes a main fiber having a fiber diameter of 4.0 μm or less (preferably 0.1 to 4.0 μm, more preferably 0.1 to 2.0 μm, particularly preferably 0.1 to 0.8 μm) and an aspect ratio of 100 to 2,500 and a binder fiber having a fiber diameter of 3.0 μm or less (preferably 0.1 to 3.0 μm, more preferably 0.1 to 1.8 μm, particularly preferably 1.0 to 1.8 μm) and an aspect ratio of 100 to 2,500.

Here, the fiber diameter can be measured from a single-fiber cross-sectional photograph at a magnification of 30,000 taken with a transmission electron microscope TEM. At this time, when the TEM has the length measurement function, the fiber diameter can be measured utilizing the length measurement function. In addition, when the TEM does not have the length measurement function, the taken photograph may be enlarged to measure the fiber diameter with a ruler considering the reduction scale. In the case where the transverse cross-sectional shape of a single fiber is not a round cross-section but a modified cross-section, the diameter of the circumscribed circle of a transverse cross-section of the single fiber is used as the fiber diameter.

In addition, an aspect ratio is the ratio L/D of the fiber length L to the fiber diameter D.

In the main fiber, when the fiber diameter is more than 4.0 μm the filter medium has a large and non-uniform pore size, resulting in a decrease in the collection performance; therefore, this is undesirable. Conversely, when the fiber diameter is less than 0.1 μm (100 nm), at the time of papermaking, fibers may easily fall down through the holes of the papermaking screen. In addition, when the aspect ratio of the main fiber is more than 2,500, at the time of papermaking, fibers may get entangled with each other, causing a blockage. Conversely, when the aspect ratio of the main fiber is less than 100, it may be difficult to cut fibers, resulting in an increase in the variation and a decrease in the dispersibility, or fibers may easily fall down from the papermaking screen, resulting in the deterioration of the papermaking properties.

The main fiber is not particularly limited in kind, but is preferably a polyester fiber, a polyphenylene sulfide (PPS) fiber, a polyolefin fiber, or a nylon (Ny) fiber.

Preferred examples of polyesters for forming polyester fibers include polyethylene terephthalate (PET), polytrimethylene terephthalate, polybutylene terephthalate, and polyethylene naphthalate. Preferred examples also include hydroxycarboxylic acid condensates containing these polyesters as main repeating units, including aromatic dicarboxylic acids such as isophthalic acid and metal salts of 5-sulfoisophthalic acid, aliphatic dicarboxylic acids such as adipic acid and sebacic acid, s-caprolactone, and the like, as well as copolymers with glycol components such as diethylene glycol, trimethylene glycol, tetramethylene glycol, and hexamethylene glycol, etc. It is also possible to use a polyester obtained by material recycling or chemical recycling or polyethylene terephthalate obtained using a monomer component produced from a biomass raw material, that is, a substance of biological origin, as described in JP-A-2009-091694. Further, it is also possible to use a polyester obtained using a catalyst containing a specific phosphorus compound or titanium compound as described in JP-A-2004-270097 or JP-A-2004-211268.

As polyarylene sulfide resins for forming polyphenylene sulfide (PPS) fibers, any of those belonging to the "polyarylene sulfide resin" category may be used. Examples of polyarylene sulfide resins include resins whose structural units are, for example, a p-phenylene sulfide unit, an m-phenylene sulfide unit, an o-phenylene sulfide unit, a phenylene sulfide sulfone unit, a phenylene sulfide ketone unit, a phenylene sulfide ether unit, a diphenylene sulfide unit, a substituted phenylene sulfide unit, a phenylene sulfide unit having a branched structure, and the like. Among them, those in which the p-phenylene sulfide unit proportion is 70 mol % or more, particularly 90 mol % or more, are preferable, and poly(p-phenylene sulfide) is still more preferable.

In addition, polyolefin fibers include polypropylene fibers and polyethylene fibers.

In addition, nylon fibers include Nylon 6 fibers and Nylon 66 fibers.

The method for producing the main fiber is not particularly limited, but the method disclosed in WO 2005/095686 is preferable. That is, in terms of fiber diameter and its uniformity, it is preferable that a composite fiber including an island component formed of a fiber-forming thermoplastic polymer and a sea component formed of a polymer that is more soluble in an aqueous alkaline solution than the fiber-forming thermoplastic polymer (hereinafter sometimes referred to as "easily soluble polymer") is subjected to alkali weight reduction processing to dissolve away the sea component, thereby producing the main fiber.

Here, when the dissolution rate ratio of the polymer easily soluble in an aqueous alkaline solution forming the sea component to the fiber-forming thermoplastic polymer forming the island component is 100 or more (preferably 300 to 3,000), the island separability is excellent; therefore, this is preferable. In the case where the dissolution rate is less than 200 times that of the fiber-forming thermoplastic polymer, during the dissolution of the sea component in the cross-sectional central portion of the fiber, because the fiber diameter is small, the separate island components in the cross-sectional surface portion of the fiber are dissolved. Accordingly, even though the weight corresponding to the sea has been reduced, the sea component in the cross-sectional central portion of the fiber cannot be completely dissolved away. This may lead to unevenness in the island component thickness or the solvent erosion of the island component itself, making it impossible to obtain a fiber having a uniform fiber diameter.

Preferred examples of easily soluble polymers for forming sea components include polyesters, aliphatic polyamides, and polyolefins such as polyethylene and polystyrene, which have particularly excellent fiber-forming properties. More specifically, polylactic acid, ultrahigh-molecular-weight polyalkylene oxide condensation polymers, and copolyesters of a polyalkylene glycol compound and 5-sodium sulfoisophthalic acid are highly soluble in an aqueous alkaline solution and thus preferable. Here, an aqueous alkaline solution refers to an aqueous solution of potassium hydroxide, sodium hydroxide, or the like. In addition to them, examples of combinations of a sea component and a solution that dissolves the sea component include formic acid for an aliphatic polyamide such as Nylon 6 or Nylon 66; trichloroethylene or the like for a polystyrene; a hydrocarbon solvent such as heat toluene or xylene for a polyethylene (particularly high-pressure low-density polyethylene or linear low-density polyethylene); and hot water for a polyvinyl alcohol or an ethylene-modified vinyl alcohol polymer.

Among polyester polymers, a polyethylene terephthalate copolyester having an intrinsic viscosity of 0.4 to 0.6, which is obtained by the copolymerization of 6 to 12 mol % 5-sodium sulfoisophthalic acid and 3 to 10 wt % polyethylene glycol having a molecular weight of 4,000 to 12,000, is preferable. Here, 5-sodium sulfoisophthalic acid contributes to improving the hydrophilicity and melt viscosity, while polyethylene glycol (PEG) improves the hydrophilicity. In addition, when PEG has a higher molecular weight, a higher hydrophilicity-enhancing effect is caused, which is believed to be attributable to its higher-order structure. However, because the reactivity decreases, resulting in a blend system, problems may occur with heat resistance or spinning stability. In addition, when the copolymerization amount is 10 wt % or more, the melt viscosity may decrease.

Meanwhile, preferred examples of less soluble polymers for forming island components include polyamides, polyesters, polyphenylene sulfides, and polyolefins. Specifically, for applications where mechanical strength and heat resistance are required, preferred examples of polyesters include polyethylene terephthalate (PET), polytrimethylene terephthalate, polybutylene terephthalate, and polyethylene naphthalate. Preferred examples also include hydroxycarboxylic acid condensates containing these polyesters as main repeating units, including aromatic dicarboxylic acids such as isophthalic acid and metal salts of 5-sulfoisophthaiic acid, aliphatic dicarboxylic acids such as adipic acid and sebacic acid, ε-caprolactone, and the like, as well as copolymers with glycol components such as diethylene glycol, trimethylene glycol, tetramethylene glycol, and hexamethylene glycol, etc. In addition, preferred examples of polyamides include aliphatic polyamides such as Nylon 6 (Ny-6) and Nylon 66 (Ny-66). In addition, polyolefins are characterized in that they are hardly affected by acids, alkalis, and the like, and also that they have relatively low melting points and thus can be used as binder components after removal as microfibers, for example. Preferred examples thereof include high-density polyethylene, medium-density polyethylene, high-pressure low-density polyethylene, linear low-density polyethylene, isotactic polypropylene, ethylene-propylene copolymers, and copolymers of ethylene and a vinyl monomer such as maleic anhydride. In particular, polyesters, such as polyethylene terephthalate, polytrimethylene terephthalate, polybutylene terephthalate, polyethylene terephthalate-isophthalate having an isophthalic acid copolymerization proportion of 20 mol % or less, and polyethylene naphthalate, and aliphatic polyamides, such as Nylon 6 and Nylon 66, have heat resistance and kinetic properties attributable to their high melting points. Accordingly, as compared with fibrillated microfibers formed of polyvinyl alcohol/polyacrylonitrile blend-spun fibers, these polymers can be used for applications where heat resistance and strength are required, and thus are preferable. Incidentally, the island component is not limited to a round cross-section, and may also have a modified cross-section such as a triangular cross-section or a flat cross-section.

Without affecting their yarn-making properties and the physical properties of the extracted main fiber, the sea component-forming polymer and the island component-forming polymer may contain various additives, such as delustering agents, organic fillers, antioxidants, heat stabilizers, light stabilizers, flame retardants, lubricants, antistatic agents, rust preventives, crosslinking agents, foaming agents, fluorescent agents, surface lubricants, surface gloss improvers, and mold release improvers such as fluorine resin, as necessary.

In the sea-island composite fiber described above, it is preferable that the melt viscosity of the sea component at the time of melt spinning is higher than the melt viscosity of the island component polymer. In such a relation, even when the composite weight proportion of the sea component is as low as less than 40%, it is unlikely to happen that islands are joined together, or most of the island components are joined together, making the fiber different from a sea-island composite fiber.

It is preferable that the melt viscosity ratio (sea/island) is within a range of 1.1 to 2.0, particularly 1.3 to 1.5. In the case where the ratio is less than 1.1, the island components are likely to be joined together at the time of melt spinning, while in the case where it is more than 2.0, the viscosity difference is so large that the spinning conditions are likely to be deteriorated.

Next, it is preferable that the number of islands is 100 or more (more preferably 300 to 1,000). In addition, it is preferable that the sea-island composite weight ratio (sea:island) is within a range of 20:80 to 80:20. Within this range, the sea component thickness between islands can be reduced, and the sea component can be easily dissolved away, making it easy to convert the island component into a microfiber; therefore, this is preferable. Here, in the case where the proportion of the sea component is more than 80%, the sea component thickness is too large, while in the case where it is less than 20%, the amount of the sea component is so small that islands are likely to be joined together.

The nozzle used for melt spinning may be any of those having hollow pins or micropores for forming island components. For example, it is possible to use a spinneret configured such that island components extruded from hollow pins or micropores and a sea component flow along a flow path designed to fill between islands are combined and compressed, thereby forming a sea-island cross-section. The discharged sea-island composite fiber is solidified with cooling air and then taken up on a rotary roller or an ejector set at a predetermined take-up rate, thereby giving an undrawn yarn. The take-up rate is not particularly limited, but is desirably 200 to 5,000 m/min. When the take-up rate is 200 m/min or less, the productivity may decrease. In addition, when it is 5,000 m/min or more, the spinning stability may decrease.

The obtained fiber may be directly subjected to a cutting step or the subsequent extraction step according to the intended use and purpose of the microfiber obtained after the extraction of the sea component. Alternatively, in order to fit to the intended strength, elongation, and thermal contraction characteristics, the obtained fiber may also be subjected to a drawing step or a heat treatment step and then to a cutting step or the subsequent extraction step. The drawing step may be performed in a separate-drawing fashion, in which spinning and drawing are performed in different steps, or may also be performed in a direct-drawing fashion, in which spinning is immediately followed by drawing in one step.

Next, the composite fiber is cut in such a manner that the ratio L/D of the fiber length L to the island diameter D is within a range of 100 to 2,500. The cutting is preferably such that several tens to several hundreds of fibers are bundled into a tow and cut using a guillotine cutter, a rotary cutter, or the like.

The fiber having a fiber diameter D is obtained by subjecting the composite fiber to alkali weight reduction processing. At this time, in the alkali weight reduction processing, it is preferable that the ratio between the fiber and the alkaline solution (bath ratio) is 0.1 to 5%, more preferably 0.4 to 3%. When the bath ratio is less than 0.1%, although the contact between the fiber and the alkaline solution increases, the processability, such as drainage, may be difficult. Meanwhile, when it is 5% or more, the fiber amount is too large, and thus fibers may get entangled with each other during the alkali weight reduction processing. Incidentally, the bath ratio is defined by the following equation.

Bath ratio (%)=(fiber mass (gr)/aqueous alkaline solution mass (gr)×100)

In addition, it is preferable that the treatment time of the alkali weight reduction processing is 5 to 60 minutes, still more preferably 10 to 30 minutes. When the treatment time is less than 5 minutes, alkali weight reduction may be insufficient. Meanwhile, when it is 60 minutes or more, even the island component may be reduced in weight.

In addition, in the alkali weight reduction processing, it is preferable that the alkali concentration is 2.0 to 10%. When the alkali concentration is less than 2%, the alkali amount may be insufficient, resulting in an extremely low weight reduction rate. Meanwhile, when it is more than 10%, alkali weight reduction may proceed too much, whereby even the island component is reduced in weight.

In the main fiber thus obtained, in the case where the main fiber is a drawn polyester fiber, the birefringence ($\Delta n$) is more than 0.05.

Incidentally, the order of the cutting step and the alkali weight reduction step may be reversed, that is, it is possible that alkali weight reduction processing is first performed, followed by cutting.

Meanwhile, in the binder fiber, when the fiber diameter is more than 3.0 μm, the filter medium has a large and non-uniform pore size, which may result in a decrease in the collection performance; therefore, this is undesirable. Conversely, when the fiber diameter is less than 0.1 μm (100 nm), at the time of papermaking, fibers may easily fall down through the holes of the papermaking screen. In addition, when the aspect ratio of the binder fiber is more than 2,500, at the time of papermaking, fibers may get entangled with each other, causing flocks (fiber lumps). Conversely, when the aspect ratio of the main fiber is less than 100, it may be difficult to cut fibers, resulting in an increase in the variation and a decrease in the dispersibility, or fibers may easily fall down from the papermaking screen, resulting in the deterioration of the papermaking properties.

It is preferable that the binder fiber is a composite fiber or an undrawn fiber. In the case of an undrawn fiber, the birefringence $\Delta n$ is usually 0.05 or less. In addition, the elongation of the undrawn fiber is usually 100% or more (preferably 100 to 800%).

Here, a preferred example of a composite fiber is a core-sheath composite fiber in which a polymer component that fuses upon the heat treatment at 80 to 170° C. performed after papermaking and thus develops a bonding effect (e.g., amorphous copolyester) serves as the sheath part, while another polymer having a melting point at least 20° C. higher than that of the above polymer (e.g., an ordinary polyester such as polyethylene terephthalate, polytrimethylene terephthalate, or polybutylene terephthalate) serves as the core part.

Incidentally, the binder fiber may be a known binder fiber in which the binder component (low-melting-point component) forms all or part of the surface of a single fiber. Examples thereof include core-sheath composite fibers, eccentric core-sheath composite fibers, and side-by-side composite fibers.

Here, the amorphous copolyester is obtained as a random or block copolymer of an acid component, such as terephthalic acid, isophthalic acid, 2,6-naphthalenedicarboxylic acid, 5-sodium sulfoisophthalic acid, adipic acid, sebacic acid, azelaic acid, dodecanoic acid, or 1,4-cyclohexanedicarboxylic acid, and a diol component, such as ethylene glycol, 1,3-propanediol, 1,4-butanediol, 1,5-pentanediol, 1,6-hexanediol, diethylene glycol, 1,4-cyclohexanediol, or 1,4-cyclohexanedimethanol. Among them, in terms of cost, terephthalic acid, isophthalic acid, ethylene glycol, and diethylene glycol, which have been widely used, are preferably used as main components. Such a copolyester has a glass transition point within a range of 50 to 100° C. and does not show a clear crystal melting point.

In addition, as an undrawn fiber, an undrawn fiber obtained by spinning preferably at a spinning rate of 800 to 1,500 m/min (still more preferably 900 to 1,150 m/min) can be mentioned. Here, it is preferable that the undrawn fiber is an undrawn fiber in which the polyester used for the island component or sea component of the sea-island composite fiber is used as at least one component. In particular, an undrawn polyester fiber in which a polyester such as polyethylene terephthalate, polytrimethylene terephthalate, or polybutylene terephthalate is used as at least one component, an undrawn polyphenylene sulfide (PPS) binder fiber in which polyphenylene sulfide (PPS) is used as at least one component, an undrawn nylon fiber in which nylon such as Nylon 6 or Nylon 66 is used as at least one component, and an undrawn polyolefin fiber in which a polyolefin such as polypropylene or polyethylene is used as at least one component are preferable. It is also possible to use an undrawn yarn of a sea-island composite fiber.

As polyarylene sulfide resins for forming undrawn polyphenylene sulfide (PPS) binder fibers, any of those belonging to the "polyarylene sulfide resin" category may be used. Examples of polyarylene sulfide resins include resins whose structural units are, for example, a p-phenylene sulfide unit, an m-phenylene sulfide unit, an o-phenylene sulfide unit, a phenylene sulfide sulfone unit, a phenylene sulfide ketone unit, a phenylene sulfide ether unit, a diphenylene sulfide unit, a substituted phenylene sulfide unit, a phenylene sulfide unit having a branched structure, and the like. Among them, those in which the p-phenylene sulfide unit proportion is 70 mol % or more, particularly 90 mol % or more, are preferable, and poly(p-phenylene sulfide) is still more preferable.

The filter medium for a liquid filter of the invention is not particularly limited in structure or production method, but is preferably a wet-laid nonwoven fabric. In addition, fibers other than the main fiber and the binder fiber may further be used.

At this time, it is important that the weight proportion of the binder fiber relative to the weight of the filter medium is within a range of 10 to 50 wt %. When the weight proportion of the binder fiber is less than 10 wt %, the strength and elongation are low, which may cause problems in a pleating or like assembly processing step, such as a decrease in the process speed. Conversely, when the weight proportion of the binder fiber is more than 50 wt %, the content of the main fiber is relatively low, which may result in a decrease in the collection performance.

It is preferable that the method for producing a wet-laid nonwoven fabric is a method in which papermaking is performed using an ordinary Fourdrinier paper machine, Tanmo paper machine, or cylinder paper machine, or alternatively a combination of two or more of these machines to perform multilayer papermaking, followed by a heat treatment. At this time, in the heat treatment step after the papermaking step, either a Yankee dryer or an air-through dryer may be used. In addition, after the heat treatment, calendering or embossing may be performed using a metal/metal roller, a metal/paper roller, or a metal/elastic roller. In particular, the calendering or embossing of a nonwoven fabric has the effects of improving the surface smoothness (uniformization of the thickness) and also increasing the strength due to the formation of bonding points. In addition, in the case where a binder fiber composed of an undrawn fiber is used, the thermocompression bonding step is important, and thus calendering or embossing is important.

In the filter medium for a liquid filter thus obtained, it is important that the weight per unit is within a range of 5 to 80 g/m² (preferably 5 to 40 g/m²). The weight per unit significantly affects the effective area, flow volume, collection efficiency, pressure drop, and the like of the filter medium for a liquid filter. In the case where the weight per unit is less than 5 g/m², the strength of the filter medium is low, and it may be difficult to form a sheet itself or a liquid filter using the same as a filter medium. Conversely, when the weight per unit is more than 80 g/m², the thickness may increase, or the pressure drop may increase. Further, in the case where a cartridge-type liquid filter is formed using the filter medium for a liquid filter, the mountable filter medium area may decrease.

In addition, it is preferable that the thickness of the filter medium for a liquid filter is within a range of 10 to 100 µm (more preferably 10 to 60 µm). In the case where the thickness is less than 10 µm, the strength of the filter medium is low, and it may be difficult to form a sheet itself or a liquid filter using the same as a filter medium. Conversely, when the thickness is more than 100 µm, the pressure drop at the time of liquid transmission may increase. Further, in the case where a cartridge-type liquid filter is formed using the filter medium for a liquid filter, the mountable filter medium area may decrease.

In addition, it is preferable that the porosity of the filter medium for a liquid filter is within a range of 50 to 90%. When the porosity is less than 50%, the pressure drop at the time of liquid transmission may increase. Conversely, when the porosity is more than 90%, the thickness increases, whereby the filter medium area mountable on a cartridge may decrease.

In addition, it is preferable that the Gurley permeability of the filter medium for a liquid filter is 10 sec/100 cc or less. When the Gurley permeability is more than 10 sec/100 cc, it may be difficult to discharge a sufficient treatment flow rate, and further the pressure drop may increase.

In addition, in the filter medium for a liquid filter, when the tensile strength is 8 N/15 mm or more in the MD direction (more preferably 8 to 50 N/15 mm) and 3 N/15 mm or more in the CD direction (more preferably 8 to 50 N/15 mm), the handleability and assemblability improve; therefore, this is preferable. In addition, when the tensile elongation is 10% or more (preferably 10 to 50%) in the MD direction and 10% or more (preferably 10 to 50%) in the CD direction, the handleability and assemblability improve; therefore, this is preferable. In the case where the strength or elongation is less than the above range, in the formation of a cartridge-type liquid filter, due to the tension during the pleating process, cracking may occur, or the reduction of the folding speed is required, resulting in a decrease in the processability.

In addition, in the filter medium for a liquid filter, when the average pore size is 2.0 µm or less (preferably 0.1 to 2.0 µm), it becomes possible to collect fine particles, and, at this time, because of the high porosity and the low weight per unit (small thickness), low pressure drop is achieved. As a result, in the collection of fine particles, the life can be prolonged, and also the collection can be achieved without allowing the passage of a deformable gelled product; therefore, this is preferable.

In the filter medium for a liquid filter of the invention, not only the main fiber but also the binder fiber has a small fiber diameter. Therefore, the filter medium has a low weight per unit (small thickness) and yet has high strength, high collectability, and a long life.

Next, the liquid filter of the invention is a cartridge-type liquid filter using the filter medium for a liquid filter described above. The liquid filter uses the filter medium for a liquid filter described above and thus has high strength, high collectability, and a long life. Therefore, the liquid filter is suitable for use in the manufacturing process of industrial products, such as foods, beverages, pharmaceuticals, and electronics.

Figure 1:
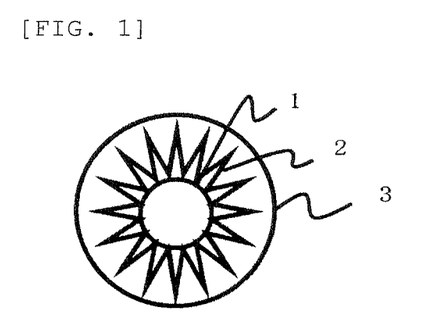
FIG. 1 is a figure schematically showing a transverse cross-section of a cartridge-type liquid filter applicable in the invention.

The cartridge-type liquid filter is not particularly limited in shape, but it is preferable that as schematically shown in FIG. 1, the cartridge-type liquid filter is cylindrical, and the filter medium for a liquid filter is pleated and placed between a core material forming the innermost layer and a protector forming the outermost layer.

Figure 2:
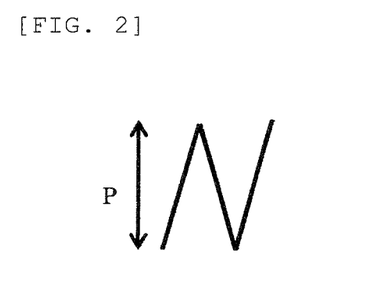
FIG. 2 is an explanatory view of the folding pitch of pleats (the distance between a peak and a trough).

At this time, it is preferable that the folding pitch of pleats (the distance between a peak and a trough) is within a range of 5 to 30 mm. In addition, it is preferable that the diameter of the core material is within a range of 10 to 200 mm.

EXAMPLES

Next, examples of the invention and comparative examples will be described in detail, but the invention is not limited thereto. Incidentally, measurement items in the Examples were measured by the following methods.

(1) Fiber Diameter

Using a transmission electron microscope TEM (with the length measurement function), a cross-sectional photograph of a fiber was taken at a magnification of 30,000, and its diameter was measured. However, as the fiber diameter, the diameter of the circumscribed circle of a single-fiber transverse cross-section was used (average of n=5).

(2) Fiber Length

Using a scanning electron microscope (SEM), ultrafine short fibers (short fiber A) before dissolving away the sea component were laid down on a base, and the fiber length L was measured at a magnification of 20 to 500 (average of n=5). At this time, the fiber length L was measured utilizing the length measurement function of the SEM.

(3) Weight Per Unit

Weight per unit was measured in accordance with JIS P8124 (Method for Measurement of Basis Weight per Square Meter of Paper).

(4) Thickness

Thickness was measured in accordance with JIS P8118 (Method for Measurement of Thickness and Density of Paper and Paper Board). The measurement was performed under a measurement load of 75 g/cm² with n=5, and the average was determined.

(5) Porosity

Calculation was performed from the above weight per unit, thickness, and fiber density using the following equation. Incidentally, the fiber density of a polyethylene terephthalate (PET) fiber is 1.36 g/cm³.

Porosity (%)=100−((weight per unit)/(thickness)/fiber density×100)

(6) Tensile Strength

Measurement was performed in accordance with JIS P8113 (Tensile Strength of Paper and Paper Board and Test Method).

(7) Average Pore Size

Measurement was performed using a Perm-Porometer manufactured by PMI.

(8) Gurley Permeability

Measurement was performed in accordance with JIS P8117 (Test Method for Permeability of Paper and Paper Board).

(8) Melt Viscosity

A polymer after a drying treatment is set on an orifice set at the extruder temperature for spinning, maintained in a molten state for 5 minutes, and then extruded under several levels of loads applied. The resulting shear rate and melt viscosity are plotted. A shear rate-melt viscosity curve was formed based on the obtained data, and the melt viscosity at a shear rate of 1,000 $sec^{-1}$ was read.

(9) Alkali Weight Reduction Rate Ratio

A sea component polymer and an island component polymer were each discharged from a nozzle having 24 round holes 0.3 mm in diameter and 0.6 mm in length and taken up at a spinning rate of 1,000 to 2,000 m/min. The obtained undrawn yarn was drawn to give a residual elongation within a range of 30 to 60%, thereby forming a multifilament of 83 dtex/24 fil. Using a 1.5 wt % aqueous NAOH (sodium hydroxide) solution at 80° C., at a bath ratio of 100, the weight reduction rate thereof was calculated from the dissolution time and the dissolution amount.

Example 1

Polyethylene terephthalate (PET) having a melt viscosity of 120 Pa·sec at 285° C. was used as an island component, and modified polyethylene terephthalate obtained by the copolymerization of 4 wt % polyethylene glycol having a melt viscosity of 135 Pa·sec at 285° C. and an average molecular weight of 4,000 and 9 mol % 5-sodium sulfoisophthalic acid was used as a sea component. The polymers were spun at a sea:island weight ratio of 10:90 using a nozzle having 400 islands, and then taken up at a spinning rate of 1,500 m/min. The difference in alkali weight reduction rate was 1,000-fold. The obtained yarn was drawn to 3.9 times the original length and then cut to 0.5 mm using a guillotine cutter to give a sea-island composite fiber. The fiber was subjected to 10% weight reduction in a 4% aqueous NaOH solution at 75° C., and the obtained fiber was used as a main fiber 1 (drawn polyester fiber, fiber diameter: 700 nm, fiber length: 0.5 mm, aspect ratio: 714, round cross-section, birefringence Δn: more than 0.05).

Meanwhile, an undrawn polyester fiber obtained by spinning polyethylene terephthalate in the usual manner was prepared and used as a binder fiber 1 (fiber diameter: 1.2 μm, fiber length: 0.4 mm, aspect ratio: 333, round cross-section, birefringence Δn: 0.05 or less, elongation: 200 to 400%).

Next, the main fiber 1 (60 wt %) and the binder fiber 1 (40 wt %) were mixed and stirred, then subjected to wet papermaking using an inclined Tanmo paper machine, and dried with a Yankee dryer at 140° C. to give a wet-laid nonwoven fabric. The wet-laid nonwoven fabric was subjected to a calendering heat treatment at 185° C., thereby producing a filter medium for a filter. The evaluation results are shown in Table 1.

Next, using the filter medium for a filter, a cartridge-type liquid filter (folding pitch P: 11 mm, core material diameter: 40 mm) as shown in FIG. 1 was obtained. The resulting filter had high strength, high collectability, and a long life.

Example 2

Polyethylene terephthalate having a melt viscosity of 120 Pa·sec at 285° C. was used as an island component, and modified polyethylene terephthalate obtained by the copolymerization of 4 wt % polyethylene glycol having a melt viscosity of 135 Pa·sec at 285° C. and an average molecular weight of 4,000 and 9 mol % 5-sodium sulfoisophthalic acid was used as a sea component. The polymers were spun at a sea:island weight ratio of 10:90 using a nozzle having 400 islands, and then taken up at a spinning rate of 1,500 m/min. The difference in alkali weight reduction rate was 1,000-fold. The obtained yarn was drawn to 3.9 times the original length and then cut to 0.4 mm using a guillotine cutter to give a sea-island composite fiber. The fiber was subjected to 10% weight reduction in a 4% aqueous NaOH solution at 75° C., and the obtained fiber was used as a main fiber 2 (drawn polyester fiber, fiber diameter: 400 nm, fiber length: 0.4 mm, aspect ratio: 1,000, round cross-section, birefringence Δn: more than 0.05).

Meanwhile, the same binder fiber 1 as in Example 1 was prepared. In addition, an undrawn polyester fiber obtained by spinning polyethylene terephthalate in the usual manner was prepared and used as a binder fiber 2 (single-fiber fineness: 0.2 dtex, fiber diameter: 4.3 μm, fiber length: 3 mm, aspect ratio: 697, round cross-section, birefringence Δn: 0.05 or less, elongation: 200 to 400%).

Next, the main fiber 2 (60 wt %), the binder fiber 1 (30 wt %), and the binder fiber 2 (10 wt %) were mixed and stirred, and then a filter medium for a filter was produced in the same manner as in Example 1. The evaluation results are shown in Table 1.

Example 3

A drawn polyester fiber obtained by spinning and drawing polyethylene terephthalate in the usual manner was prepared and used as a main fiber 3 (single-fiber fineness: 0.1 dtex, fiber diameter: 3.05 μm, fiber length: 3 mm, aspect ratio: 983, round cross-section, birefringence Δn: more than 0.05).

Next, the main fiber 3 (60 wt %) and the same binder fiber 1 as in Example 1 (40 wt %) were mixed and stirred, and then a filter medium for a filter was produced in the same manner as in Example 1. The evaluation results are shown in Table 1.

Example 4

The same main fiber 1 as in Example 1 (30 wt %), the same main fiber 2 as in Example 2 (30 wt %), the same main fiber 3 as in Example 3 (20 wt %), and the same binder main fiber 1 as in Example 1 (20 wt %) were mixed and stirred, and then a filter medium for a filter was produced in the same manner as in Example 1. The evaluation results are shown in Table 1.

Example 5

Polyphenylene sulfide (PPS) having a melt viscosity of 130 Pa·sec at 295° C. was used as an island component, and modified polyethylene terephthalate obtained by the copolymerization of 4 wt % polyethylene glycol having a melt viscosity of 145 Pa·sec at 295° C. and an average molecular weight of 4,000 and 9 mol % 5-sodium sulfoisophthalic acid was used as a sea component. The polymers were spun at a sea:island weight ratio of 30:70 using a nozzle having 400 islands, and then taken up at a spinning rate of 1,500 m/min. The difference in alkali weight reduction rate was 1,000-fold. The obtained yarn was drawn to 3.5 times the original length and then cut to 0.5 mm using a guillotine cutter to give a sea-island composite fiber. The fiber was subjected to 10% weight reduction in a 4% aqueous NaOH solution at 75° C., and the obtained fiber was used as a main fiber 4 (drawn polyphenylene sulfide fiber, fiber diameter: 700 nm, fiber length: 0.5 mm, aspect ratio: 714, round cross-section, birefringence Δn: more than 0.05).

Meanwhile, an undrawn polyphenylene sulfide fiber obtained by spinning polyphenylene sulfide in the usual manner was prepared and used as a binder fiber 3 (fiber diameter: 1.2 μm, fiber length: 0.4 mm, aspect ratio: 333, round cross-section, and birefringence Δn is 0.05 or less).

Next, the main fiber 4 (60 wt %) and the binder fiber 2 (40 wt %) were mixed and stirred, then subjected to wet papermaking using an inclined Tanmo paper machine, and dried with a Yankee dryer at 150° C. to give a wet-laid nonwoven fabric. The wet-laid nonwoven fabric was subjected to calendering (heat treatment temperature: 200° C.), thereby producing a filter medium for a filter. The evaluation results are shown in Table 1.

Next, a cartridge-type liquid filter was obtained using the filter medium for a filter. The resulting filter had high strength, high collectability, and a long life.

Example 6

Nylon 6 (Ny-6) having a melt viscosity of 125 Pa·sec at 285° C. was used as an island component, and modified polyethylene terephthalate obtained by the copolymerization of 4 wt % polyethylene glycol having a melt viscosity of 135 Pa·sec at 285° C. and an average molecular weight of 4,000 and 9 mol % 5-sodium sulfoisophthalic acid was used as a sea component. The polymers were spun at a sea:island weight ratio of 30:70 using a nozzle having 800 islands, and then taken up at a spinning rate of 1,500 m/min. The difference in alkali weight reduction rate was 1,000-fold or more. The obtained yarn was drawn to 3.2 times the original length and then cut to 0.5 mm using a guillotine cutter to give a sea-island composite fiber. The fiber was subjected to 10% weight reduction in a 4% aqueous NaOH solution at 75° C., and the obtained fiber was used as a main fiber 5 (drawn Nylon 6 fiber, fiber diameter: 400 nm, fiber length: 0.5 mm, aspect ratio: 714, round cross-section, birefringence Δn: more than 0.05).

Meanwhile, an undrawn Nylon 6 fiber obtained by spinning Nylon 6 in the usual manner was prepared and used as a binder fiber 4 (fiber diameter: 1.2 μm, fiber length: 0.4 mm, aspect ratio: 333, round cross-section, birefringence Δn: 0.05 or less, elongation: 200 to 400%).

Next, the main fiber 5 (60 wt %) and the binder fiber 4 (40 wt %) were mixed and stirred, then subjected to wet papermaking using an inclined Tanmo paper machine, and dried with a Yankee dryer at 130° C. to give a wet-laid nonwoven fabric. The wet-laid nonwoven fabric was subjected to calendering (heat treatment temperature: 180° C.), thereby producing a filter medium for a filter. The evaluation results are shown in Table 1.

Next, a cartridge-type liquid filter was obtained using the filter medium for a filter. The resulting filter had high strength, high collectability, and a long life.

Comparative Examples 1 to 8

Main fibers and binder fibers were selected, mixed, and stirred as shown in Table 1, and then each filter medium for a filter was produced in the same manner as in Example 1. The evaluation results are shown in Table 1.

In Comparative Examples 1 to 3, an ultrafine binder fiber having a fiber diameter of 3.0 μm or less is not contained. As a result, the strength and elongation were low, causing problems in a pleating or like assembly processing step, such as a decrease in the process speed. In Comparative Example 4, the amount of ultrafine binder fiber having a fiber diameter of 3.0 μm or less is small. As a result, the strength and elongation were low, causing problems in a pleating or like assembly processing step, such as a decrease in the process speed. In Comparative Example 5, the weight per unit is small. As a result, uniform sheet formation was not possible. In addition, in Comparative Example 6, the weight per unit is as large as 90 g/m². As a result, although the pore size was fine, and the strength and elongation values were both large, because the Gurley permeability was high, and also the thickness was large, after the production of a filter cartridge, it was difficult to discharge a sufficient treatment flow rate. Further, because the pressure drop was high, the transmission of fine particles or gelled products was difficult. In Comparative Example 7, the aspect ratio of the main fiber is high. As a result, the dispersibility in a papermaking slurry was poor, and the sheet had poor uniformity, resulting in low strength and elongation. In addition, in Comparative Example 8, the aspect ratio of the ultrafine binder fiber is small. Thus, presumably because of falling down from the papermaking screen, the weight per unit was small as compared with the fiber loading, and also the strength and elongation were both insufficient.

TABLE 1

| | | Item | Unit | Example 1 | Example 2 | Example 3 | Example 4 | Example 5 | Example 6 | Comparative Example 1 |
|---|---|---|---|---|---|---|---|---|---|---|
| Composition | Main Fiber 1 | PET Diameter: 700 nm | wt % | 60 (714) | | | | 30 (714) | | 60 (714) |
| | Main Fiber 2 | PET Diameter: 400 nm | wt % | | 60 (1000) | | | 30 (1000) | | |
| | Main Fiber 3 | PET 0.1 dtex × 3 mm | wt % | | | 60 (983) | 20 (983) | | | |
| | Main Fiber 4 | PPS Diameter: 700 nm | wt % | | | | | | 60 (750) | |
| | Main Fiber 5 | Ny-6 Diameter: 400 nm | wt % | | | | | | | 60 (1000) |

TABLE 1-continued

|  | | Item | Unit | | | | | | | |
|---|---|---|---|---|---|---|---|---|---|---|
|  | Binder Fiber 1 | PET Diameter: 1.2 μm | wt % | 40 (333) | 30 (333) | 40 (333) | 20 (333) | | | |
|  | Binder Fiber 2 | PET 0.2 dtex 3 mm | wt % | | 10 (698) | | | | | 40 (698) |
|  | Binder Fiber 3 | PPS Diameter: 1.2 μm | wt % | | | | | 40 (333) | | |
|  | Binder Fiber 4 | Ny-6 Diameter: 1.2 μm | wt % | | | | | | 40 (666) | |
| Physical Properties | | Weight per Unit | g/m² | 10 | 10 | 18 | 15 | 20 | 20 | 12 |
|  | | Thickness | μm | 16.0 | 16.8 | 28.8 | 25.5 | 37.8 | 34.5 | 24.2 |
|  | | Porosity | % | 54.0 | 56.2 | 54.0 | 56.7 | 61.7 | 51.7 | 63.5 |
|  | | Tensile Strength (MD direction) | N/15 mm | 10.46 | 8.52 | 21.40 | 16.70 | 10.4 | 13.0 | 3.76 |
|  | | Tensile Elongation (MD direction) | % | 13.99 | 11.00 | 24.70 | 19.30 | 8.1 | 12.6 | 2.81 |
|  | | Tensile Strength (CD direction) | N/15 mm | 5.59 | 4.52 | 6.20 | 5.20 | 8.3 | 8.7 | 0.89 |
|  | | Tensile Elongation (CD direction) | % | 15.07 | 13.05 | 31.07 | 16.40 | 6.2 | 21.3 | 1.27 |
|  | | Average Pore Size | μm | 0.81 | 0.45 | 1.68 | 0.56 | 0.6 | 0.45 | 1.92 |
|  | | Gurley Permeability | sec/100 cc | 1.47 | 5.34 | 2.12 | 3.46 | 7.2 | 6.2 | 0.41 |

Remarks

|  |  | Item | Unit | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Composition | Main Fiber 1 | PET Diameter: 700 nm | wt % | | | 80 (714) | 60 (714) | 60 (714) | 60 (3000) | 60 (714) |
|  | Main Fiber 2 | PET Diameter: 400 nm | wt % | 60 (1000) | | | | | | |
|  | Main Fiber 3 | PET 0.1 dtex × 3 mm | wt % | | 60 (983) | | | | | |
|  | Main Fiber 4 | PPS Diameter: 700 nm | wt % | | | | | | | |
|  | Main Fiber 5 | Ny-6 Diameter: 400 nm | wt % | | | | | | | |
|  | Binder Fiber 1 | PET Diameter: 1.2 μm | wt % | | | 8 (333) | 40 (333) | 40 (333) | 40 (333) | 40 (83) |
|  | Binder Fiber 2 | PET 0.2 dtex 3 mm | wt % | 40 (698) | 40 (698) | 12 (698) | | | | |
|  | Binder Fiber 3 | PPS Diameter: 1.2 μm | wt % | | | | | | | |
|  | Binder Fiber 4 | Ny-6 Diameter: 1.2 μm | wt % | | | | | | | |
| Physical Properties | | Weight per Unit | g/m² | 12 | 10 | 20 | 3.6 | 90 | 10 | 8.4 |
|  | | Thickness | μm | 25.7 | 13.2 | 36.5 | | 118 | 17.3 | 12.2 |
|  | | Porosity | % | 65.7 | 44.3 | 59.7 | | 43.9 | 57.5 | 49.4 |
|  | | Tensile Strength (MD direction) | N/15 mm | 4.58 | 8.27 | 6.7 | | 56.3 | 8.2 | 6.3 |
|  | | Tensile Elongation (MD direction) | % | 3.17 | 11.05 | 7.4 | | 33.2 | 9.6 | 8.9 |
|  | | Tensile Strength (CD direction) | N/15 mm | 2.60 | 3.07 | 4.6 | | 48.9 | 4.1 | 3.7 |
|  | | Tensile Elongation (CD direction) | % | 3.64 | 11.99 | 3.8 | | 36.8 | 8.6 | 6.2 |
|  | | Average Pore Size | μm | 0.80 | 7.15 | 0.67 | | 0.14 | 1.7 | 1.85 |

TABLE 1-continued

| | Gurley Permeability | sec/100 cc | 1.35 | 0.06 | 7 | | 30 | 1.27 | 0.97 |
|---|---|---|---|---|---|---|---|---|---|
| Remarks | | | | | | Various items unmeasurable due to high unevenness | | | |

Incidentally, numbers in parentheses in the table are aspect ratios.

INDUSTRIAL APPLICABILITY

According to the invention, a filter medium for a liquid filter, which has a low weight per unit and yet has high strength, high collectability, and a long life, and also a liquid filter are provided. Thus, the industrial value of the invention is extremely high.

REFERENCE SIGNS LIST

1: Core material
2: Filter medium
3: Protector

The invention claimed is:

1. A filter medium for a liquid filter,
   comprising a main fiber having a fiber diameter of 4.0 μm or less and an aspect ratio of 100 to 2,500 and a binder fiber having a fiber diameter of 3.0 μm or less and an aspect ratio of 100 to 2,500, the weight proportion of the binder fiber relative to the weight of the filter medium being 10 to 50 wt %; and
   having a weight per unit within a range of 5 to 80 g/m²; and
   having a thickness within a range of 10 to 100 μm.

2. The filter medium for a liquid filter according to claim 1, wherein the main fiber includes a polyester fiber, a polyphenylene sulfide fiber, a polyolefin fiber, or a nylon fiber.

3. The filter medium for a liquid filter according to claim 2, wherein the binder fiber includes a composite fiber or an undrawn fiber.

4. The filter medium for a liquid filter according to claim 1, wherein the binder fiber includes a composite fiber or an undrawn fiber.

5. The filter medium for a liquid filter according to claim 1, wherein the filter medium for a liquid filter includes a wet-laid nonwoven fabric.

6. The filter medium for a liquid filter according to claim 1, having a porosity within a range of 50 to 90%.

7. The filter medium for a liquid filter according to claim 6, wherein the porosity is within a range of 50 to 61.7%.

8. The filter medium for a liquid filter according to claim 1, having a tensile strength of 8 N/15 mm or more in the MD direction and 3 N/15 mm or more in the CD direction.

9. The filter medium for a liquid filter according to claim 1, having a tensile elongation of 10% or more in the MD direction and 10% or more in the CD direction.

10. The filter medium for a liquid filter according to claim 1, having an average pore size of 2.0 μm or less.

11. A liquid filter comprising the filter medium for a liquid filter according to claim 1 and being cartridge type.

12. The filter medium for a liquid filter according to claim 1, wherein the binder fiber has a fiber diameter of 0.1 to 1.8 μm.

13. The filter medium for a liquid filter according to claim 1, wherein the weight proportion of the binder fiber relative to the weight of the filter medium is 10 to 20 wt %.

* * * * *